United States Patent
Joshi et al.

(10) Patent No.: US 9,609,471 B2
(45) Date of Patent: Mar. 28, 2017

(54) METHOD AND APPARATUS FOR CONVEYING POINT OF INTEREST DATA WITH MINIMUM DATA EXCHANGE

(71) Applicant: Nokia Technologies Oy, Espoo (FI)

(72) Inventors: Dhaval Joshi, Bangalore (IN); Pankaj Nathani, Gujarat (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/443,331

(22) PCT Filed: Oct. 30, 2013

(86) PCT No.: PCT/FI2013/051024
§ 371 (c)(1),
(2) Date: May 15, 2015

(87) PCT Pub. No.: WO2014/080072
PCT Pub. Date: May 30, 2014

(65) Prior Publication Data
US 2015/0296335 A1   Oct. 15, 2015

(30) Foreign Application Priority Data

Nov. 22, 2012 (IN) .......................... 4874/CHE/2012

(51) Int. Cl.
*H04W 24/00* (2009.01)
*H04W 4/02* (2009.01)
*G06Q 30/02* (2012.01)

(52) U.S. Cl.
CPC .......... *H04W 4/02* (2013.01); *G06Q 30/0269* (2013.01)

(58) Field of Classification Search
CPC .... G01C 21/3679; G01C 21/20; G01C 21/00; G01C 21/3602; G01C 21/3614;
(Continued)

(56) References Cited

U.S. PATENT DOCUMENTS 6,552,682 B1   4/2003  Fan
7,797,104 B2   9/2010  Finn et al.
(Continued)

FOREIGN PATENT DOCUMENTS

JP   2010-060786   3/2010
WO   2011155936   12/2011
WO   2012000530   1/2012

OTHER PUBLICATIONS

International Search Report and Written Opinion received for corresponding Patent Cooperation Treaty Application No. PCT/FI2013/051024 , dated Feb. 4, 2014, 13 pages.

*Primary Examiner* — Nimesh Patel
(74) *Attorney, Agent, or Firm* — Alston & Bird LLP

(57) ABSTRACT

An approach is provided for determining a first location-based record associated with at least one device (501). Next, the point of interest platform causes, at least in part, a specification of a second location-based record relative to the first location-based record (503). Subsequently, the point of interest platform causes, at least in part, a transmission of the second location-based record to the at least one device (505), wherein transmission of the second location-based record to the at least one device is based, at least in part, on the one or more codes.

20 Claims, 13 Drawing Sheets

(58) Field of Classification Search
CPC ... G01C 21/3629; G01C 21/34; G01C 21/3641; G01C 21/3673; G01C 21/3685; G01C 21/32; G01C 21/3415; G01C 21/3484; G01C 21/3667; G01C 17/02; G01C 21/26; H04W 4/005; H04W 4/025; H04W 88/16; H04W 36/32; H04W 52/283; H04M 1/72572; H04M 1/72538; H04M 11/04; H04M 1/04; H04M 1/67; H04M 1/72522; H04M 1/72527

See application file for complete search history.

(56) References Cited

U.S. PATENT DOCUMENTS

| | | | |
|---|---|---|---|
| 7,903,005 B2 | 3/2011 | Ueda | |
| 8,131,460 B2 | 3/2012 | Severson | |
| 2004/0236504 A1* | 11/2004 | Bickford | G01C 21/3679 |
| | | | 701/408 |
| 2005/0203698 A1 | 9/2005 | Lee | |
| 2007/0118278 A1* | 5/2007 | Finn | G06F 17/30241 |
| | | | 701/438 |
| 2011/0093194 A1* | 4/2011 | Paik | G01C 21/32 |
| | | | 701/532 |
| 2011/0098916 A1* | 4/2011 | Jang | G01C 21/3697 |
| | | | 701/533 |
| 2011/0179027 A1 | 7/2011 | Das et al. | |
| 2011/0244882 A1 | 10/2011 | Hancock | |
| 2013/0204529 A1* | 8/2013 | Puchtler | G01C 21/32 |
| | | | 701/533 |

* cited by examiner

METHOD AND APPARATUS FOR CONVEYING POINT OF INTEREST DATA WITH MINIMUM DATA EXCHANGE

RELATED APPLICATION

This application was originally filed as PCT Application No. PCT/FI2013/051024 filed Oct. 30, 2013 which claims priority benefit from Indian Patent Application No. 4874/CHE/2012 filed Nov. 22, 2012.

BACKGROUND

Service providers and device manufacturers (e.g., wireless, cellular, etc.) are continually challenged to deliver value and convenience to consumers by, for example, providing compelling network services. One area of interest is providing device users with on demand access to point of interest (POI) information such as location information, contact information etc. Typically, POI data are shown alongside the lines on a map with navigation directions associated with a given location. Unfortunately, the use of map applications is dependent on data plans, and POI data can be considerably heavy given that areas have huge concentration of POIs. Accordingly, service providers and device manufacturers face significant technical challenges to enable device users to access POI data with minimum data exchange.

SOME EXAMPLE EMBODIMENTS

Therefore, there is a need for an approach to minimize data exchange when using map applications, by causing transmission of specification of a second location based record relative to the determined first location based record to the at least one device.

According to one embodiment, a method comprises determining a first location-based record associated with at least one device. The method also comprises causing, at least in part, a specification of a second location-based record relative to the first location-based record. The method further comprises causing, at least in part, a transmission of the second location-based record to the at least one device.

According to another embodiment, an apparatus comprises at least one processor, and at least one memory including computer program code for one or more computer programs, the at least one memory and the computer program code configured to, with the at least one processor, cause, at least in part, the apparatus to determine a first location-based record associated with at least one device. The apparatus is also caused to cause, at least in part, a specification of a second location-based record relative to the first location-based record. The apparatus is further caused to cause, at least in part, a transmission of the second location-based record to the at least one device.

According to another embodiment, a computer-readable storage medium carries one or more sequences of one or more instructions which, when executed by one or more processors, cause, at least in part, an apparatus to determine a first location-based record associated with at least one device. The apparatus is also caused to cause, at least in part, a specification of a second location-based record relative to the first location-based record. The apparatus is further caused to cause, at least in part, a transmission of the second location-based record to the at least one device.

According to another embodiment, an apparatus comprises means for determining a first location-based record associated with at least one device. The apparatus also comprises means for causing, at least in part, a specification of a second location-based record relative to the first location-based record. The apparatus further comprises means for causing, at least in part, a transmission of the second location-based record to the at least one device.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method disclosed herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for causing transmission of specification of a second location based record relative to the determined first location based record to the at least one device are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
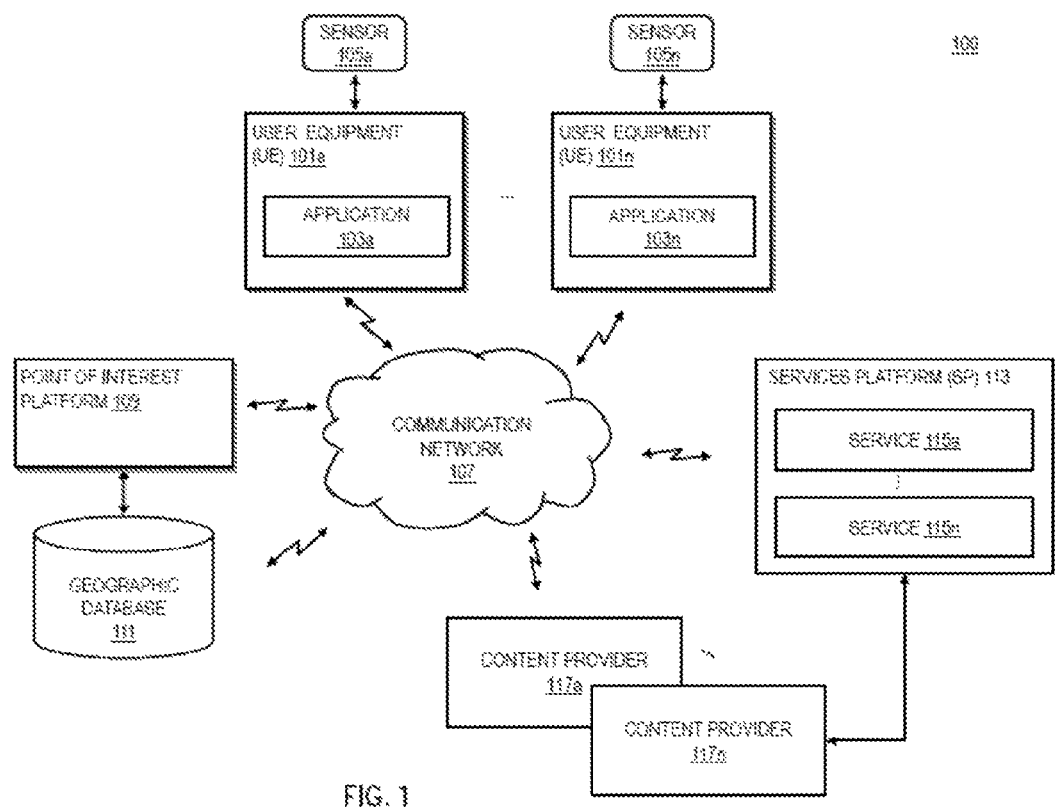
FIG. 1 is a diagram of a system capable of causing transmission of specification of a second location based record relative to the determined first location based record to the at least one device, according to one embodiment.

FIG. 1 is a diagram of a system capable of causing transmission of specification of a second location based record relative to the determined first location based record to the at least one device, according to one embodiment. As noted previously, device users regularly rely on routing applications and corresponding services to access information regarding a travel route. By way of such tools, users may access maps for detailing the route, navigation directions, information regarding various POI they may encounter, etc. Typically, the routing option is visually depicted as various lines or objects presented to map. Further, various textual and graphic elements may be presented along the map to represent the POIs in addition to a list of navigation directions. On the other hand, the growing popularity of navigation services is resulting in an increase in the number of POIs, causing rise in data consumption. One big challenge with the use of navigation services is the dependence on data plan, and POI data can be considerably heavy given that numerous areas have huge concentration of POIs. This problem is extremely acute on emerging markets where users are very cost conscious. Therefore, the service providers and device manufacturers (e.g., wireless, cellular, etc.) are continually challenged to provide compelling network services, that may include, transfer of POI information with minimum data exchange.

To address these issues, a system 100 of FIG. 1 introduces the capability to provide the device users with the ability to access POI information with minimum data exchange, wherein the point of interest platform 109 determines a first location-based record associated with at least one device. Then, the point of interest platform 109 causes, at least in part, a specification of a second location-based record relative to the first location-based record. Subsequently, the point of interest platform 109 causes, at least in part, a transmission of the second location-based record to the at least one device. Such, first location based record, the second location based record, or a combination thereof includes, at least in part, a POI record, a contact record or a combination thereof. In one scenario, POI may be determined based on user interaction coupled with location information (e.g., proximity information, historical user information, predicted user information, contextual information, location-based content information etc.) associated with the UE 101. In this way, the system 100 can present a POI information on a mapping user interface of UE 101 by causing transmission of specification of a second location based record relative to the determined first location based record wherein the specification of the second location-based record relative to the first location-based record comprises reusing information associated first location-based record to specify the second location-based record.

In one embodiment, the system 100 makes transfer of POI information easier by causing abstraction of one or more values, the one or more other values, the first location based record, the second location based record or a combination thereof. Such abstraction comprises determining one or more codes for representing the one or more values, the one or more other values, the first location based record, the second location based record or a combination thereof. Further, the abstraction of a first one of the one or more values, the one or more other values, or a combination thereof is used independently of the abstraction of a second one of the one or more values, the one or more other values, or a combination thereof. As mentioned, one big challenge with the use of maps during navigation or exploration is that the map can be highly data consuming. For example, each POI may be typically identified by name (e.g., XYZ restaurant) or street number (e.g., 1234 Main Street) or brand logo, such information can be considerably heavy and may cause problems for cost conscious users dependent on data plan. As illustrated, each POI has location based information and/or content information. Such location based information and/or content based information may be abstracted to a unique code, and the determined code may be transmitted to the at least one device as a representation of the content information for a POI. In another embodiment, the presentation of the code with the POI helps users to identify the POI simply by looking for similar code patterns, rather than reading the text and/or associating the texts to the real life spaces, hence, making it easier to spot the destination. In this way, the system 100 resolves problems associated with typical navigation services, for example, by allowing users to associate code patterns as visual guidance for a POI and, thus, providing an approach for easy and speedy wayfinding techniques.

In one scenario, for instance, a user wants to meet his clients at XYZ restaurant (e.g., a POI). As such, the user may use his mobile phone to access navigation services while driving to XYZ restaurant. In this example, XYZ restaurant has some kind of visual identity (e.g., logos, location information, contact information etc.). In various embodiments, the system 100 (e.g., via a point of interest platform 109) may process such content information and abstract the location information and/or contact information. The abstracted information is then converted into codes for presentation to the user (e.g. XYZ restaurant (#@P225646)). The determined codes for the first location based record may be used globally and may be independent, as well as, the codes may be used locally for other POIs relative to the determined first location based record. In this way, a navigation service may present the user with a code representation of the POI information as visual guidance when displaying mapping and/or navigation information and enabling users to access POI information with minimum data exchange.

In another scenario, if the user also wants to visit ABC restaurant (e.g., a POI) situated in the same location, the system 100 renders a presentation of ABC restaurant with the same code used for XYZ restaurant in the user interface of the navigation service (e.g. ABC restaurant (#@P225646)). The determination of the one or more codes is based, at least in part, on one or more geographic areas associated with the first location based record, the second location based record, or a combination thereof. Accordingly, each POI refers to the previous or first instance of the POI that was sent to the device user, hence reusing the information pieces that are already sent to the user's device. As a result system 100 avoids duplication of content information and increases efficiency and the perceived user experience. In addition, this process is applicable to any POI that may have similar location and/or content information to the previous or first POI that was sent to the user's device. In many situations, it is easier for the user to quickly identify codes associated with the POI as opposed to text (e.g., street number of the POI etc.). This ease of identification is particularly helpful when the user is driving, where the speed of the vehicle of the vehicle makes identifying text-based identifiers more difficult when compared to code-based identification.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UEs 101 have connectivity to a point of interest platform 109 via the communication network 107. In another embodiment, the point of interest platform 109 performs one or more functions associated with determining location based records and abstracting location based records wherein the abstraction comprises determining one or more codes for representing the location based records. Such determined codes are presented in association with the UE 101, for instance, in conjunction with the applications 103 and/or related services 115a-115n of the services platform 113. By way of example, the applications 103 may be any type of application that is executable at the UE 101, such as mapping applications, navigation applications, and/or any other applications that may use POI information including general applications such as media player applications, social networking applications, calendar applications, content provisioning services, and the like. In one embodiment, one of the applications 103 at the UE 101 may act as a client for point of interest platform 109 and perform one or more functions associated with the functions of the point of interest platform 109. In addition, the sensors 105 may be any type of sensor. In one embodiment, the sensors 105 may include one or more sensors that may assist the point of interest platform 109 to determine code representation for a POI. In one scenario, the sensors 105 may include location sensors (e.g., GPS), light sensors, moisture sensors, pressure sensors, audio sensors (e.g., microphone), or receivers for different short-range communications (e.g., Bluetooth, WiFi, etc.).

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the point of interest platform 109 may include or have access to a geographic database 111 to access or store any kind of data associated with POI, such as historical user information, location proximity information, temporal proximity information, contextual proximity information, etc. Data stored in the geographic database 111 may, for instance, be provided by the UEs 101, a service platform 113, one or more services 115a-115n (or services 115), or one or more content providers 117a-117n (or content providers 117). In one embodiment, the geographic database 111 stores information of the code pattern associated with each POI. Accordingly, the data can be very compact (e.g., on the order of bits rather than bytes), thereby making the storage and transmission of the POI information very efficient. For example, in network environments with limited or expensive data connectivity, reducing the data load for transfer can provide technical benefits such as reduce network traffic load, computational load, etc. as well as reduced costs to the end user.

In one embodiment, the point of interest platform 109 may be a platform with multiple interconnected components. The point of interest platform 109 may include multiple servers, intelligent networking devices, computing devices, components and corresponding software for performing the function of providing identification of a POI, for instance, by providing a code representation for a POI. In addition, it is noted that the point of interest platform 109 may be a separate entity of the system 100, a part of the one or more services 115 of the service platform 113, or included within the UE 101 (e.g., as part of the application 103).

In one embodiment, the point of interest platform 109 may cause, at least in part, an enabling of the presentation of code as an identification of the POI, on determining location based records associated with the POI upon processing of the location information and/or content information associated with the POI. As indicated in the above scenario, a user may want to visit POI (e.g., XYZ restaurant). When the user opens the navigation application, his location is known to the server. The user then enters the information for POI in his mobile communication device (e.g., UE 101), the mobile communication device then sends a request to the point of interest platform 109 for abstraction of the location information and/or content information into codes. The point of interest platform 109 then communicates with the geographic database 111, the services platform 113 and the content provider 117 for relevant code information. Such communication makes it possible to refer to other POIs with similar location information and/or content information, and reuse their codes. The transmission of the second location based record to the at least one device is based, at least in part, on the one or more codes.

In various embodiments, the point of interest platform 109 may predetermine the code for a POI or may determine the code on demand. Such determination of one or more codes is based, at least in part, on one or more geographic areas associated with the first location based record, the second location based record, or a combination thereof. In one scenario, the point of interest platform 109 retrieves content information associated with the POI and processes them. Then, the point of interest platform 109 abstracts location information and/or content information from the determined POI to determine codes. The point of interest platform 109 then converts the location information and/or content information into codes and then associates the code with the POI. The point of interest platform 109 then sends the determined codes to UE 101 for presentation with the POI. Upon presentation of the one or more codes as visual guidance information for locating the POI, the user can learn what codes are associated with the POI and can easily spot the POI in the real life environment based on the codes.

The services platform 113 may include any type of service. By way of example, the services platform 113 may include mapping services, navigation services, social networking services, content (e.g., text, images, etc.) provisioning services, application services, storage services, contextual information determination services, location based services, information (e.g., weather, news, etc.) based services, etc. In one embodiment, the services platform 113 may interact with the UE 101, the point of interest platform 109 and the content providers 117 to supplement or aid in the processing of the content information. In other embodiments, the services platform 113, the services 115, the applications 103, etc. may be used to cause transmission of specification of a second location based record relative to the first location based record.

By way of example, services 115 may be an online service that reflects interests and/or activities of users. In one scenario, the services 115 provide representations of each user (e.g., a profile), his/her social links, and a variety of additional information. The services 115 allow users to share location information, activities information, contextual information, historical user information and interests within their individual networks, and provides for data portability. The services 115 may additionally assist in providing the point of interest platform 109 with occurrence information of the one or more codes for POI.

The content providers 117 may provide content to the UE 101, the point of interest platform 109, and the services 115 of the services platform 113. The content provided may be any type of content, such as textual content, image content, etc. In one embodiment, the content providers 117 may provide content that may supplement content of the applications 103, the sensors 105, or a combination thereof. By way of example, the content providers 117 may provide content that may aid in the processing of the content information associated with a POI to determine codes associated with a POI. In one embodiment, the content providers 117 may also store content associated with the UE 101, the point of interest platform 109, and the services 115 of the services platform 113. In one embodiment, the content providers 117 may manage access to a central repository of data, and offer a consistent, standard interface to data, such as a repository of users' navigational data content.

By way of example, the UE 101, the point of interest platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
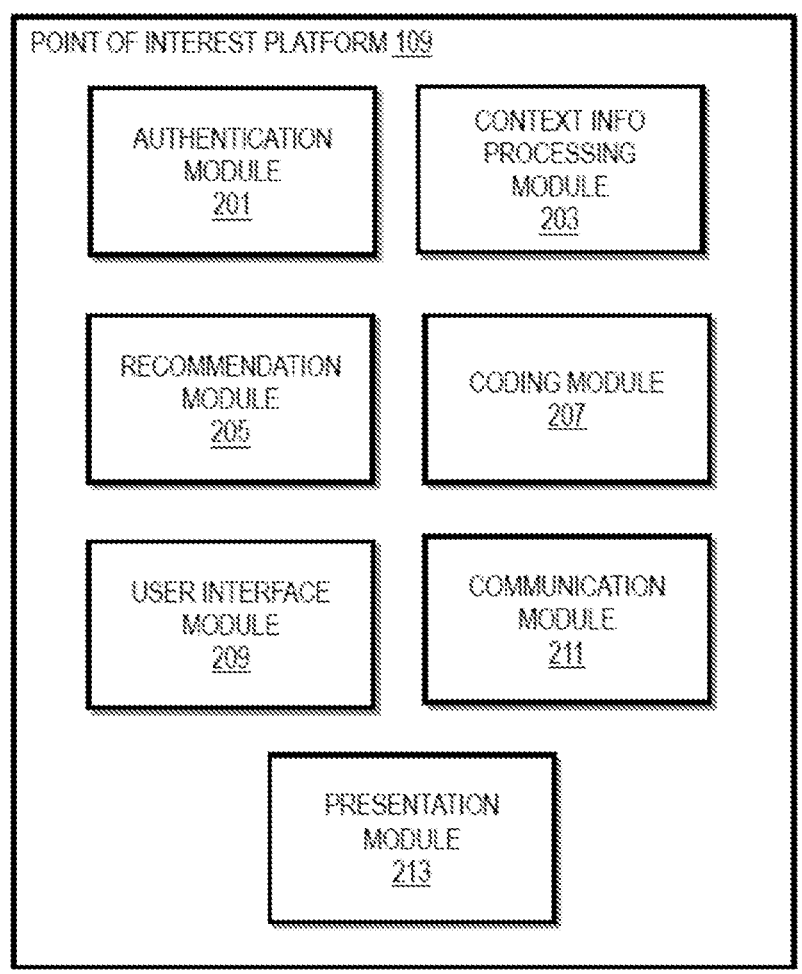
FIG. 2 is a diagram of the components of the point of interest platform 109, according to one embodiment.

FIG. 2 is a diagram of the components of a point of interest platform 109, according to one embodiment. By way of example, the point of interest platform 109 includes one or more components to minimize data exchange when using a navigation application, by causing transmission of a specification of the second location based record relative to the determined first location based record to the at least one device, according to one embodiment. It is contemplated that the functions of these components may be combined in one or more components or performed by other components of equivalent functionality. In this embodiment, the point of interest platform 109 includes an authentication module 201, context information processing module 203, recommendation module 205, coding module 207, user interface module 209, communication module 211 and presentation module 213.

In one embodiment, an authentication module 201 authenticates users and UE 101 for interaction with the point of interest platform 109. By way of example, the authentication module 201 receives a request to subscribe to the point of interest platform 109 for enabling generation of route images with POI data, in connection with a selected POI. The subscription process may include, for example, establishing one or more services the user is affiliated with as well as their respective access credential information. Subscription may also entail selection of an "opt-in" option, wherein users of the point of interest platform 109 permits sharing of their context information (e.g., location information, position information and temporal information) as collected via one or more sensors 105 of UE 101 and/or geographic database 111 and/or services 113. Preferences and settings information may be referenced to a specific user, user device, or combination thereof and maintained in the geographic database 111. It is further noted, in certain embodiments, that the subscription process may be coordinated with a subscription process of a given services 115 accessed by a user.

The authentication process performed by the module 201 may also include receiving and validating a login name and/or user identification value as provided or established for a particular user during a subscription or registration process with the service provider. The login name and/or user identification value may be received as input provided by the user from UE 101 or other device via a graphical user interface to the point of interest platform 109 (e.g., as enabled by user interface module 209). Profile data pursuant to registration may be cross referenced as part of the login process. Alternatively, the login process may be performed through automated association of profile settings maintained with an IP address, a carrier detection signal of a user device, mobile directory number (MDN), subscriber identity module (SIM) (e.g., of a SIM card), radio frequency identifier (RFID) tag or other identifier.

The authentication module 201 may also be alerted of an input received via the user interface for indicating a user requested action. It is noted that the user interface module 209 supports presentment of the user interface element for presenting such images while the authentication module 201 interprets input provided to the user as they engage the point of interest platform 109. The authentication module 201 is therefore configured to receive requests for generation of a map image with POI data via the service or application.

In one embodiment, the context information processing module 203 receives context information as gathered by the sensors 105 of respective UE 101 and/or geographic database 111 and/or services 115. Once received, the context information processing module 203 analyzes the context information to determine the relative location, time, position and other information useful for generating a map in association with a specified location. Based on this determination, the context information processing module 203 triggers execution of the recommendation module 205.

The recommendation module 205 recommends the codes based on the occurrence information of the one or more codes for the POI to the device users registered with the point of interest platform 109. As the context information processing module 203 determines context information and processes them. Next, the recommendation module 205 recommends, codes for POI based on the similarity of location information and/or content information. In some embodiments, the user may have identified certain code patterns to be associated with certain POIs, hence the recommendation module may recommend code representation on the basis of such occurrence information, for simplicity and easy identification. Further, the recommendation module 205 may recommend the point of interest platform 109 to refrain from using similar code already used for a point of interest, to avoid confusion. For instance, if two points of interest have different location information and/or content information but has similar codes, then the recommendation module 205 may recommend the point of interest platform 109 to use different codes.

The coding module 207 causes an abstraction of the one or more values, the one or more other values, the first location-based record, the second location-based record, or a combination thereof. Then, the coding module 207 determines one or more codes for representing the one or more values, the one or more other values, the first location-based record, the second location-based record, or a combination thereof.

In one embodiment the user interface module 209 enables presentment of a graphical user interface for presenting map images in connection with a selected POI. By way of example, the user interface module 209 generates the user interface element in response to detection of an input for selection of POI in a map. As another example, the user interface module 209 enables highlighting of POI with determined codes presented via the user interface. Of note, the user interface module 209 triggers execution of the various other modules, including the authentication module 201 in response to user input. The user interface module 209 employs various application programming interfaces (APIs) or other function calls corresponding to the application 103 of UE 101; thus enabling the display of graphics primitives such as menus, buttons, data entry fields, etc., for generating the user interface elements.

In one embodiment, a communication module 211 enables formation of a session over a communication network 107 between the point of interest platform 109 and the services 115. By way of example, the communication module 211 executes various protocols and data sharing techniques for enabling collaborative execution between a subscriber's UE 101 and the point of interest platform 109 over the communication network 107.

The presentation module 213 makes a presentation of the map with determined POI with their respective codes highlighted therein upon receiving the data from communication module 211. The presentation module 213 may utilize the geographic database and/or services 115 to determine whether the information for POI is up to date. This module obtains a set of summary statistics from other modules. Then, the module continues with generating a presentation corresponding to the POI and continues with providing of presentation data set where the presentation could be depicted in one or more visual display units.

The above presented modules and components of the point of interest platform 109 can be implemented in hardware, firmware, software, or a combination thereof. Though depicted as a separate entity in FIG. 1, it is contemplated that the point of interest platform 109 may be implemented for direct operation by respective UE 101. As such, the point of interest platform 109 may generate direct signal inputs by way of the operating system of the UE 101 for interacting with the application 103. In another embodiment, one or more of the modules 201-213 may be implemented for operation by respective UEs, as a point of interest platform 109, or combination thereof. Still further, the point of interest platform 109 may be integrated for direct operation with services 115, such as in the form of a widget or applet, in accordance with an information and/or subscriber sharing arrangement. The various executions presented herein contemplate any and all arrangements and models.

Figure 3:
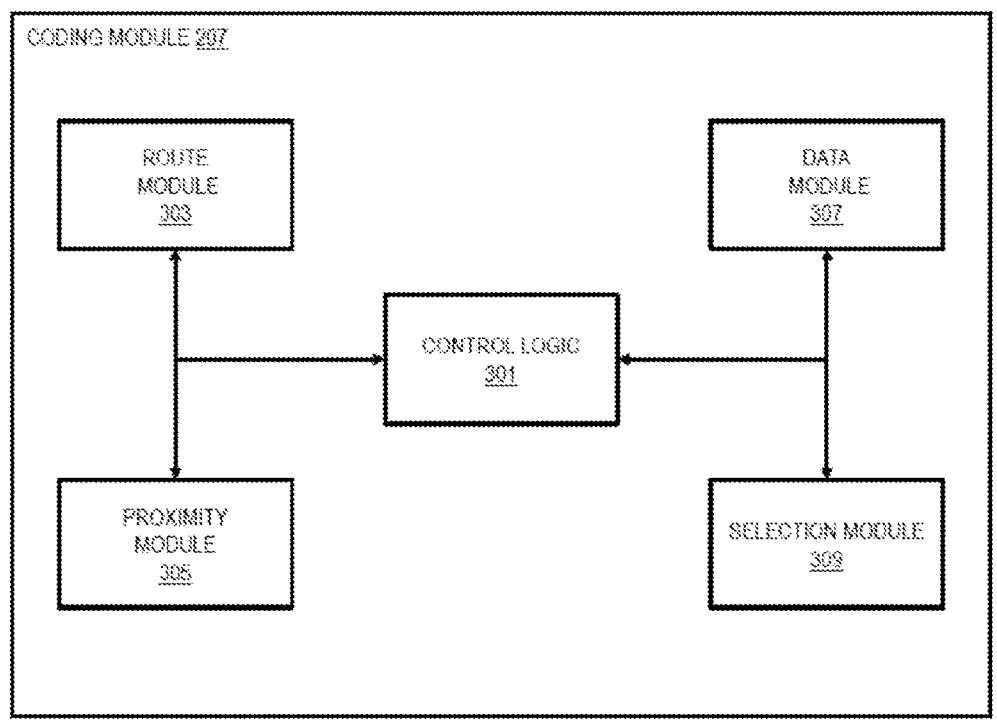
FIG. 3 is a diagram of the components of the coding module 207, according to one embodiment.

FIG. 3 is a diagram of the components of the coding module 207, according to one embodiment. By way of example, the coding module 207 includes one or more components for causing an abstraction of the one or more values, the one or more other values, the first location-based record, the second location-based record, or a combination thereof to one or more codes. It is contemplated that the functions of these components may be combined in one or more components or performed by other components of equivalent functionality. In this embodiment, the coding module 207 includes a control logic 301, route module 303, proximity module 305, data module 307 and selection module 309.

The control logic 301 executes at least one algorithm for executing functions at the presentation module 213. For example, the control logic 301 may interact with the route module 303 to receive one or more geo-routes associated with one or more UEs 101. In one embodiment, the route module 303 may determine one or more geo-routes using historical and/or predicted user information, such as the daily work commute traveled by one or more UEs 101. With the one or more geo-routes, the control logic 301 and the proximity module 305 may determine proximity information of one or more UEs 101 to one or more POI. The control logic 301 and the proximity module 305 may determine proximity information that includes, at least in part, location, temporal, contextual proximity information, or a combination thereof.

The data module 307 may provide the control logic 301 with POI information, while the selection module 309 may select the determined POI based, at least in part, on the proximity information determined by the proximity module 305. For instance, the selected POI with one or more geo-routes and/or one or more location anchors within a certain proximity threshold of one or more UEs 101 may be chosen out of all the other POI. Alternately, the control logic 301 and selection module 309 may sort the one or more POI based on proximity information. For example in one scenario, the control logic 301 and selection module 309 may determine to select the top ten POIs that are geographically closest to a UE 101.

In one embodiment, the selection module 309 may select the one or more POI based, at least in part, on the location information. For instance, one or more POI information may be selected because the history of geo-routes indicates that they will soon be proximate location (e.g., regardless of whether the UEs 101 are already in the location, as the predicted user information suggests that UEs 101 may soon be within the vicinity). Further, the selection module 309 may determine one or more predicted locations of a user based, at least in part, on the ease of access from a location associated with the UEs 101. Further, the selection module 309 may interact with other modules of point of interest platform 109 to direct the one or more UEs 101 to determined codes for respective POI contents. For example, the control logic 301 and application 103 may work together to determine navigation guidance information to cause, at least in part, a presentation of the one or more POI with their determined codes.

Figure 4:
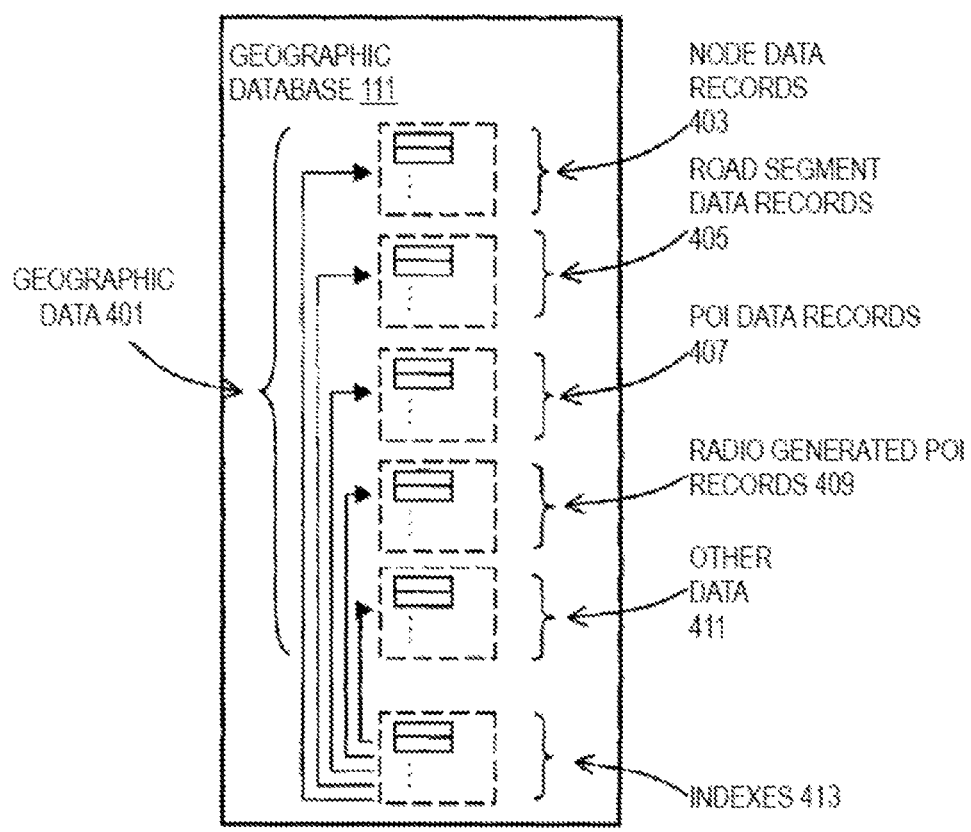
FIG. 4 is a diagram of geographic database 111 of system 100, according to exemplary embodiments.

FIG. 4 is a diagram of geographic database 111 of system 100, according to exemplary embodiments. In the exemplary embodiments, POIs and map generated POIs data can be stored, associated with, and/or linked to the geographic database 111 or data thereof. In one embodiment, the geographic or map database 111 includes geographic data 401 used for (or configured to be compiled to be used for) mapping and/or navigation-related services, such as for personalized route determination, according to exemplary embodiments. For example, the geographic database 111 includes node data records 403, road segment or link data records 405, POI data records 407, radio generated POI records 409, and other data records 411, for example. More, fewer or different data records can be provided. In one embodiment, the other data records 411 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In exemplary embodiments, the road segment data records 405 are links or segments representing roads, streets, or paths, as can be used in the calculated route or recorded route information for determination of one or more personalized routes, according to exemplary embodiments. The node data records 403 are end points corresponding to the respective links or segments of the road segment data records 405. The road link data records 405 and the node data records 403 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 407. The geographic database 111 can also include data about places, such as cities, towns, or other communities, and other geographic features, such as bodies of water, mountain ranges, etc. Such place or feature data can be part of the POI data records 407 or can be associated with POIs or POI data records 407 (such as a data point used for displaying or representing a position of a city). In addition, the geographic database 111 can include data from radio advertisements associated with the POI data records 407 and their respective locations in the radio generated POI records 409. By way of example, the POI is determined from the user interaction with the UE 101 and the content information associated with UE 101, according to the various embodiments described herein.

The geographic database 111 can be maintained by the content provider in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UEs 101) to provided navigation-related functions. For example, the geographic database 111 can be used with the end user device 101 to provide an end user with navigation features. In such a case, the geographic database 111 can be downloaded or stored on the end user device UE 101, such as in applications 103, or the end user device UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions such as guidance and map display, for example, and for determination of one or more personalized routes or route segments based on one or more calculated and recorded routes, according to exemplary embodiments.

Figure 5:
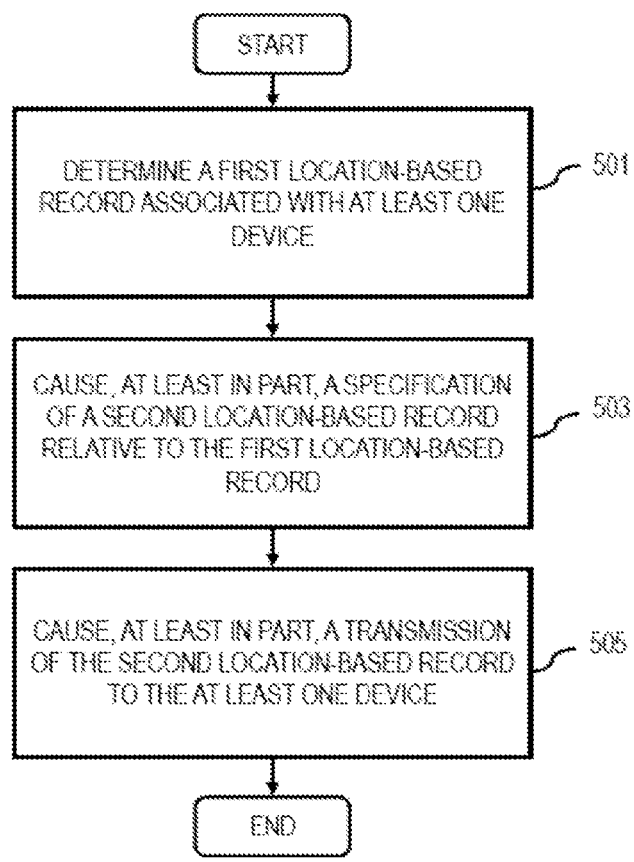
FIG. 5 is a flowchart of a process for causing transmission of specification of a second location based record relative to the determined first location based record to the at least one device, according to one embodiment.
Figure 12:
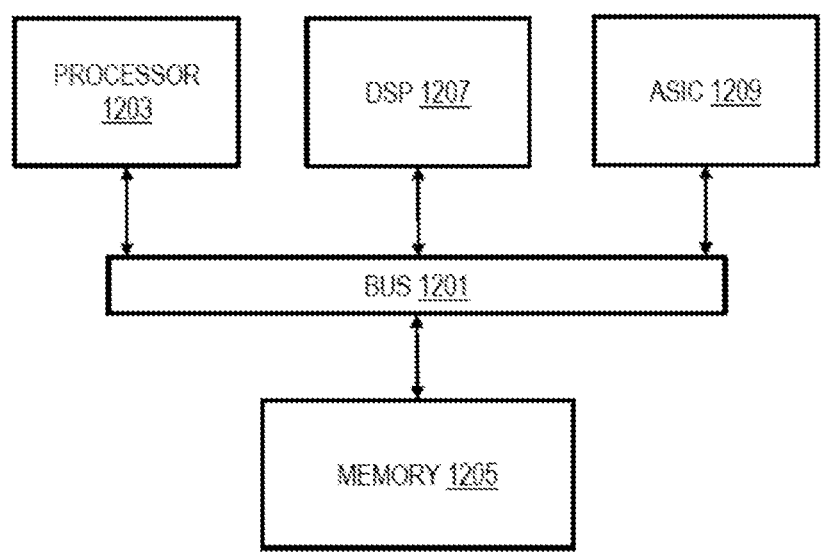
FIG. 12 is a diagram of a chip set that can be used to implement an embodiment of the invention.

FIG. 5 is a flowchart of a process for causing transmission of specification of a second location based record relative to the determined first location based record to the at least one device, according to one embodiment. In one embodiment, the point of interest platform 109 performs the process 500 and is implemented in, for instance, a chip set including a processor and a memory as shown in FIG. 12.

In step 501, the point of interest platform 109 determines a first location-based record associated with at least one device, wherein the first location-based record includes, at least in part, one or more fields containing one or more values, the method further comprising: causing, at least in part, a specification of one or more other values of one or more other fields of the second location-based record relative to the one or more values. In one embodiment, the point of interest platform 109 processes content information associated with at least one POI to determine one or more codes associated with the content information. The point of interest platform 109 then determines at least one leader POI and one or more follower POI, wherein the one or more follower POI includes at least one reference to the leader POI, other follower POI, or a combination. The point of interest platform 109 causes an abstraction of various components of the content information associated with the at least one POI to the determined codes.

In step 503, the point of interest platform 109 causes, at least in part, a specification of a second location-based record relative to the first location-based record, wherein the specification of the second location-based record relative to the first location-based record comprises reusing information associated first location-based record to specify the second location-based record. In addition, the first location-based record, the second location-based record, or a combination thereof includes, at least in part, a point-of-interest record, a contact record, or a combination thereof. In one scenario, the POI codes are associated with certain parameters of POI, these codes are repeated when new POI comprises of such parameters. A relative referencing is used where second POI gets the relative details from the first POI. At the same time it is possible to break this cyclic referral chain and a cross referencing could be established where second POI seeks data from the first POI and sixth, seventh and eighth POI may seek details from the third and the fourth POI. The point of interest platform 109 causes, at least in part, a re-usage of the one or more codes based, at least in part, on the similarity of components for the one or more content information associated with the at least one POI.

In step 505, the point of interest platform 109 causes, at least in part, a transmission of the second location-based record to the at least one device, wherein the transmission of the second location-based record to the at least one device is based, at least in part, on the one or more codes. In one embodiment, the point of interest platform 109 causes, at least in part, a presentation in the UE 101 of the one or more codes as a representation of the content information for the at least one POI.

Figure 6:
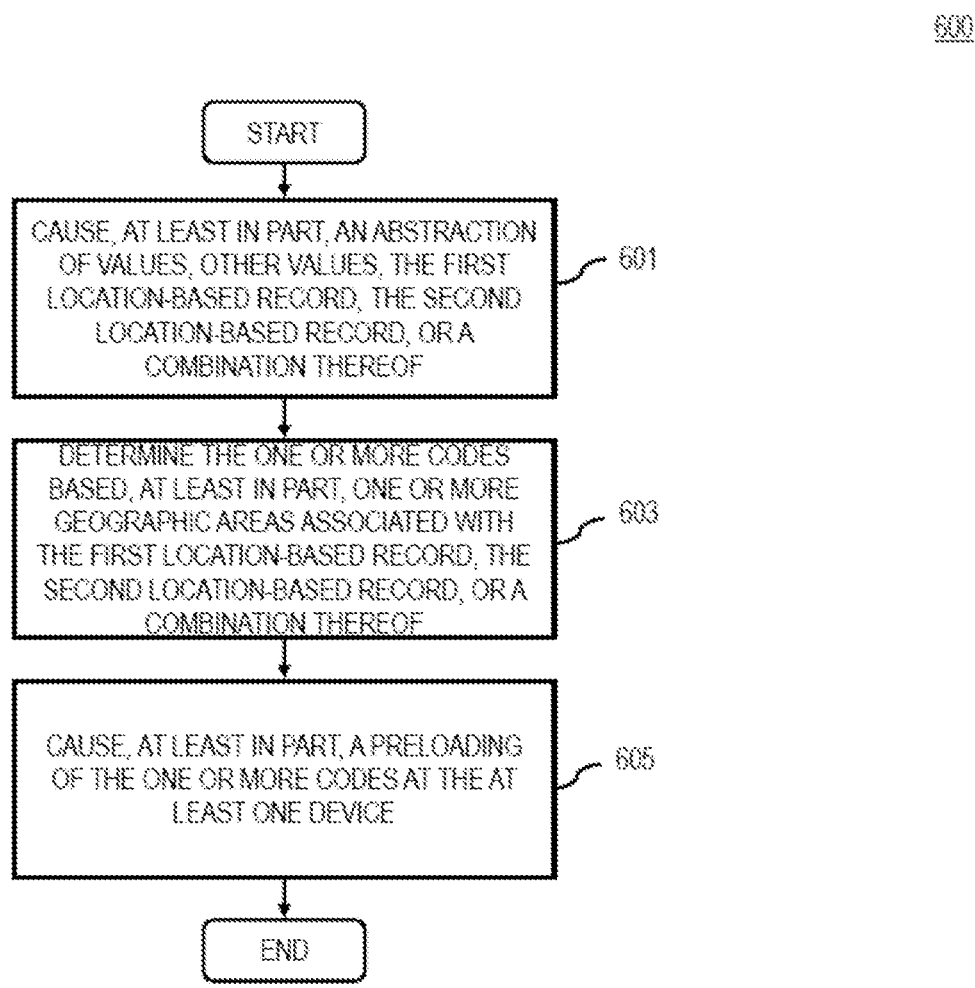
FIG. 6 is a flowchart of a process for causing abstraction and determining codes based, at least in part, one or more geographic areas associated with the first location-based record, the second location-based record, or a combination thereof, according to one embodiment.

FIG. 6 is a flowchart of a process for causing abstraction and determining codes based, at least in part, one or more geographic areas associated with the first location-based record, the second location-based record, or a combination thereof, according to one embodiment. In one embodiment, the point of interest platform 109 performs the process 600 and is implemented in, for instance, a chip set including a processor and a memory as shown in FIG. 12.

In step 601, the point of interest platform 109 causes, at least in part, an abstraction of the one or more values, the one or more other values, the first location-based record, the second location-based record, or a combination thereof. This process of abstraction comprises determining one or more codes for representing the one or more values, the one or more other values, the first location-based record, the second location-based record, or a combination thereof and wherein the abstraction of a first one of the one or more values, the one or more other values, or a combination thereof is used independently of the abstraction of a second one of the one or more values, the one or more other values, or a combination thereof. In one embodiment, the point of interest platform 109 may determine, at least in parts, popular components within the content information, and cause at least in parts, an abstraction of the determined popular content, enabling cross referencing of such abstracted content information between the POIs.

In step 603, the point of interest platform 109 determines the one or more codes based, at least in part, one or more geographic areas associated with the first location-based record, the second location-based record, or a combination thereof. The determined codes may be independent from each other such that each component of the content information for POI has a unique code. Further, such unique code makes it possible for one or more follower POI to be interdependent to each other.

In step 605, the point of interest platform 109 causes, at least in part, a preloading of the one or more codes at the at least one device. In one embodiment, the point of interest platform 109 makes it possible to preload maps and gives the users the latest location content. As a result, the users are able to relate to the offline available database to the online updated content.

Figure 7:
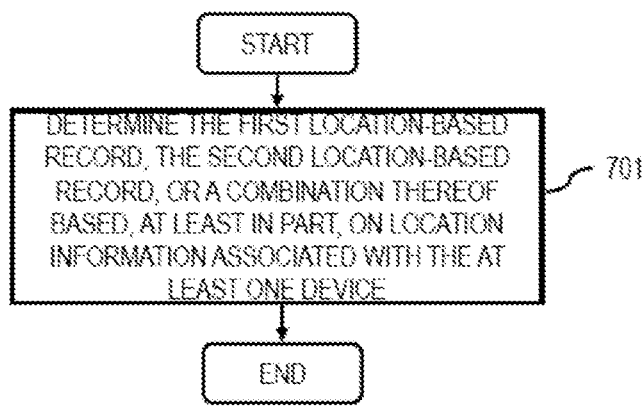
FIG. 7 is a flowchart of a process for determining the first location-based record, the second location-based record, or a combination thereof based, at least in part, on location information associated with the at least one device, according to one embodiment.

FIG. 7 is a flowchart of a process for determining the first location-based record, the second location-based record, or a combination thereof based, at least in part, on location information associated with the at least one device, according to one embodiment. In one embodiment, the point of interest platform 109 performs the process 700 and is implemented in, for instance, a chip set including a processor and a memory as shown in FIG. 12.

In step 701, the point of interest platform 109 determines the first location-based record, the second location-based record, or a combination thereof based, at least in part, on location information associated with the at least one device. In one scenario, whenever a user needs to go to several destinations, the user may use his mobile phone to use the navigation services for directions. The point of interest platform 109 processes the relevant POIs and determines the first location based record and the second location based record based on the content information associated with UE 101. Such determination makes it possible to cause, at least in part, a reference to the determined one or more codes for the content information of the at least one POI.

Figure 8:
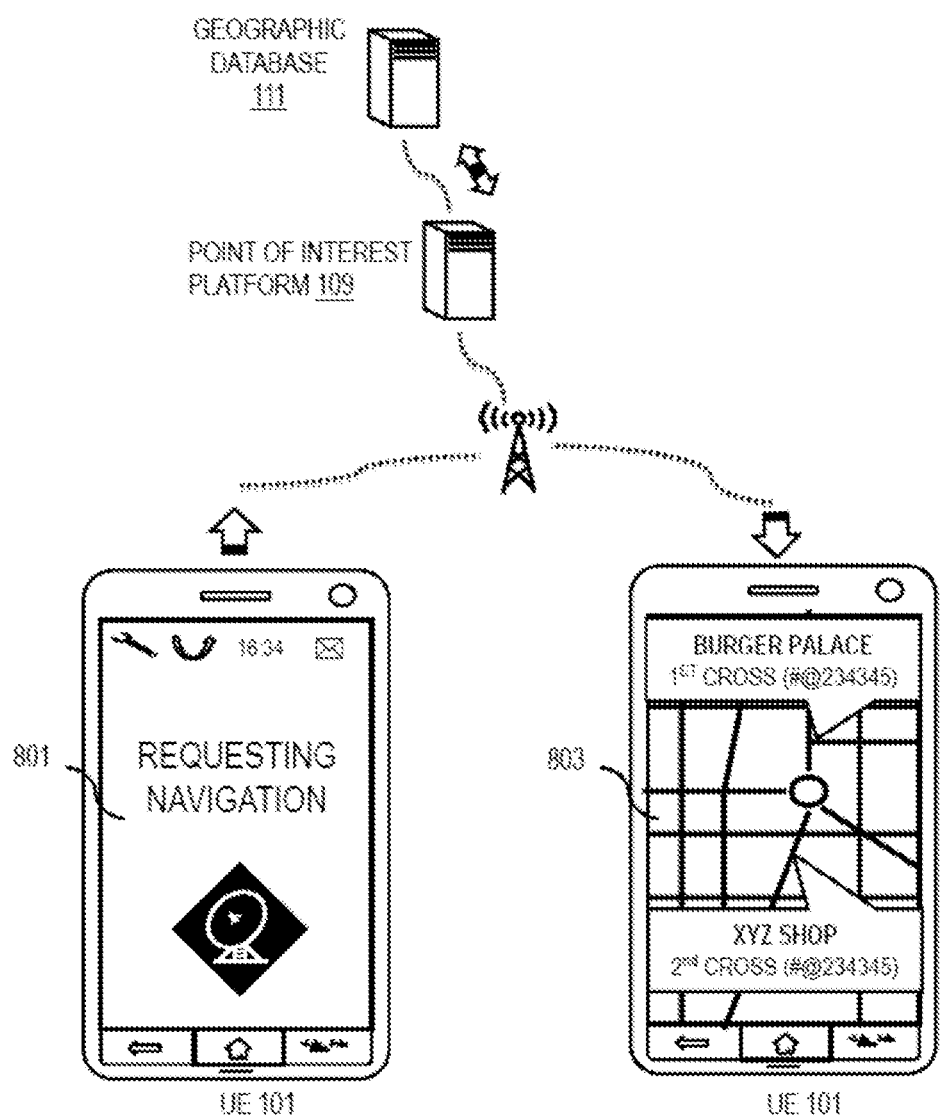
FIG. 8 is a diagram of user interface utilized in the processes of FIGS. 5-7, according to various embodiments.

FIG. 8 is a diagram of user interfaces utilized in the processes of FIGS. 5-7, according to various embodiments. For example, FIG. 8 illustrates a method for presentation of one or more codes as an identification of the POI. In one scenario, whenever a user needs to go to several destinations, the user may use his mobile phone (e.g., UE 101a with user interface 801) to use the navigation services while driving to those destinations. The idea is that those destinations have some kind of content information (e.g., location information, contact information, brand names or logos) to it. In one embodiment, the point of interest platform 109 crawls through various systems of the communication network 107 and may gain access to the content information related to the POI. The location attributes for determined POI are then abstracted. This abstraction could be independent of each other such that each attribute has global unique codes. The abstracted codes are then displayed when presenting information related to the POI.

As illustrated, a user sends an abstraction request from UE 101 to the point of interest platform 109. The point of interest platform 109 then communicates with several services, such as the services 115 and/or content providers 117 and/or geographic database 111, for relevant content information. Next, the point of interest platform 109 finds the content information associated with the POI and processes them. The point of interest platform 109 then converts them into codes and then associates the codes with the POI. Subsequently, the point of interest platform 109 then sends the determined codes to UE 101. The interface 803 of UE 101 displays the presentation of the one or more codes as visual representation for the POI (user interface 803).

As shown in FIG. 8, the user's device downloads POI, Burger palace. The determined POI may possess the following information:

(a) POI Name: Burger palace
Address: 1st cross, Ayyappa-reddy Layout,
Outer Ring Road,
Marathahalli Hosur Junction,
Bangalore—560037

The point of interest platform 109 may present the determined POI as follows:
Burger palace,
1st cross (#@234345)

The code @234345 may be re-used as a code for another POI.

(b) POI Name: XYZ shop
Address: Ayyappa-reddy Layout,
Outer Ring Road,
Marathahalli Hosur Junction,
Bangalore—560037

The point of interest platform 109 by identifying this reference of the second POI (@234345) in the first POI (Burger palace, which was downloaded on the user's device), the point of interest platform 109 can show the second POI on the map as well. This may be a longer chain, and the second POI may have a third POI as a reference, and so on.

Therefore, by downloading only one POI on the user's device, there may be the possibility to show the users numerous POIs, this can enhance the user experience of the navigation application, while saving data cost for the user.

Figure 9:
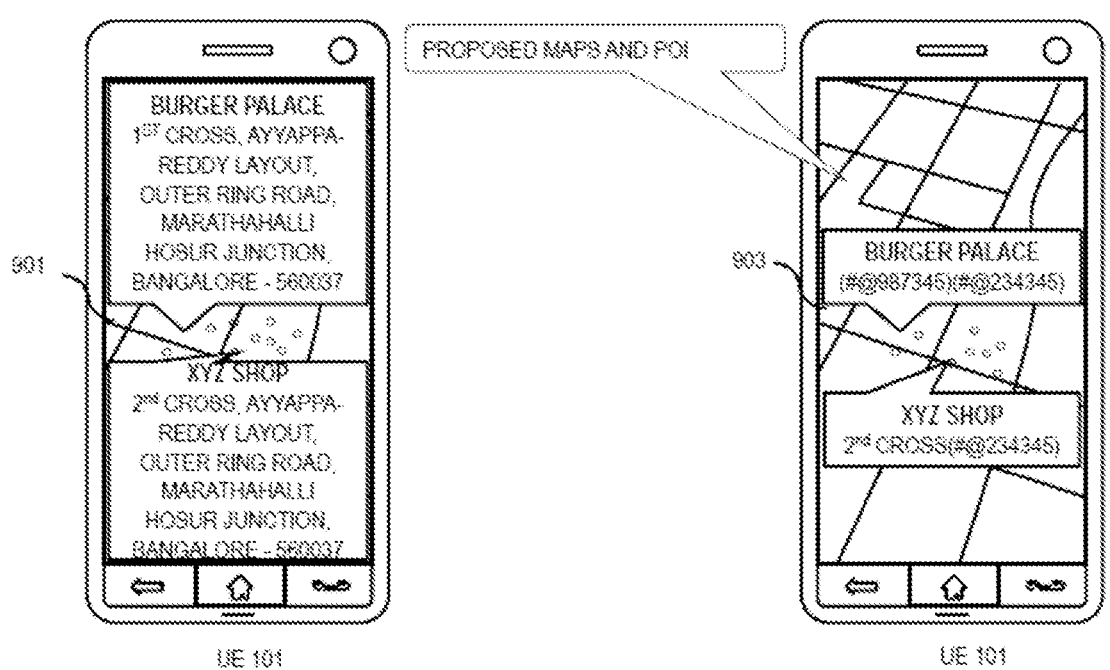
FIG. 9 is a diagram of user interface utilized in the processes of FIGS. 5-7, according to various embodiments.

FIG. 9 is a diagram of user interfaces utilized in the processes of FIGS. 5-7, according to various embodiments. As illustrated, user interface 901 depicts a presentation of POI information in a navigation application wherein all the information for POI is displayed. On the other hand, the user interface 903 depicts a process wherein the point of interest platform 109 may process the first location based record associated with at least one device. Then, the point of interest platform 109 may cause, at least in part, a specification of a second location based record relative to the first location based record. Subsequently, the point of interest platform 109 causes, a transmission of the second location based record to the at least one device.

In one embodiment, the point of interest platform 109 may cause an abstraction and may assign unique identifiers to very common locations and may link such unique identifiers to other different POIs or locations. In one scenario, "ABC road" may be present in numerous locations. The point of interest platform 109 may identify such popular parts of the POI, to avoid duplication by creating one unique ID for the part of the POI. This would save data transfer charges for users and faster performance for maps application. Such, cross referencing parts of POI's abstractions in other POIs makes it possible for the users of UE 101 to access POI information with minimum data exchange.

In one scenario, there may be numerous POIs in a close geographic area (represented in user interface 901 and 903), and each POI may have an average of six attributes (1. Name, 2. number, 3. street name, 4. area name, 5. city, 6. zip). As illustrated, the first POI may have two set of codes, (#@987345) representing $1^{st}$ cross and (#@234345) representing the remaining location information. Therefore, when a user downloads the POIs in the same area, only the first POI has all attributes from the server. The second POI has (Name, number, #ref to first POI attribute 3, 4, 5, 6). The remaining POIs have (Name, #ref to second POI for 2 and 3, #ref to first POI for 4, 5 and 6). The value proposition is that instead of simply giving a unique ID to the whole POI, the point of interest platform 109 abstract each of these components to unique set of codes. The first POI (termed as the leader POI) carries most of the attributes to the user's device and then the rest of the POIs (termed as the Follower POIs) may try and re-use as much information as they can. In addition, there is an interdependent relationship between the two or more follower POIs. In such manner coded information can be re-used for all relevant POIs.

Figure 10:
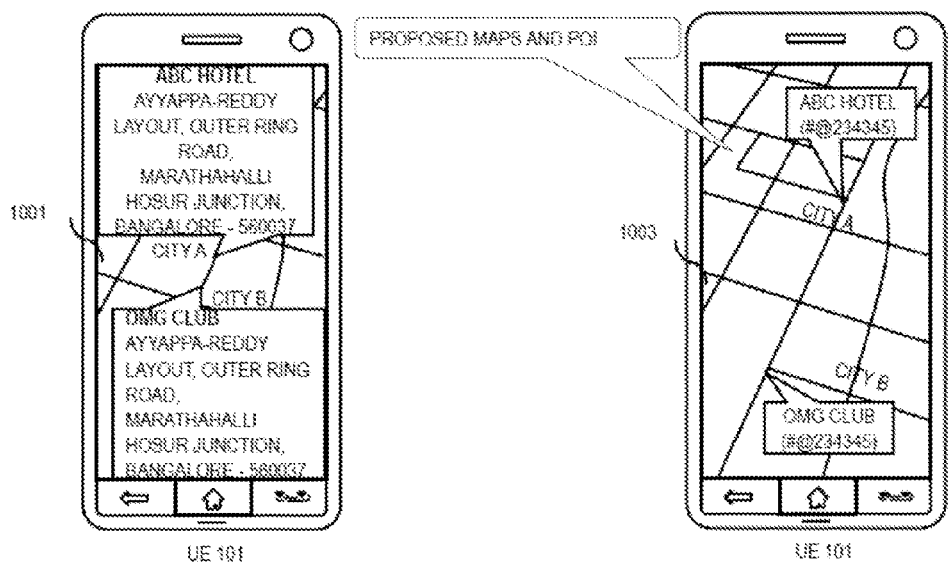
FIG. 10 is a diagram of user interface utilized in the processes of FIGS. 5-7, according to various embodiments.

FIG. 10 is a diagram of user interfaces utilized in the processes of FIGS. 5-7, according to various embodiments. In one embodiment, there may be million POIs in one location and each POI address could have at least 2-3 shared components. Therefore, instead of downloading each POI individually, the point of interest platform 109 makes it possible to pass on the determined code for one or more POI so that maps application may reuse the codes (e.g., de-abstract) from a neighboring POI (since neighboring POI may contain shared components like area, street name, city name, zip etc.).

In another embodiment, it is common to find similar street names in multiple cities. As illustrated, maps can save a lot of data and processing by using one code for similar street name ID across multiple cities. For instance, Ayyappa reddy layout may be present in all major cities, and the maps application are using lot of data for generating similar information resulting in redundancy of data already present in Maps. Such tactics may be applicable to similar business names, for instance, there may be numerous XYZ franchises, the current Maps stores each of these POI individually. However, huge amount of data may be saved by creating one unique ID for word "XYZ". The invention proposes to simplify the process—saving data transfer charges for user and faster performance for Maps.

The processes described herein for causing transmission of specification of a second location based record relative to the determined first location based record to the at least one device may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
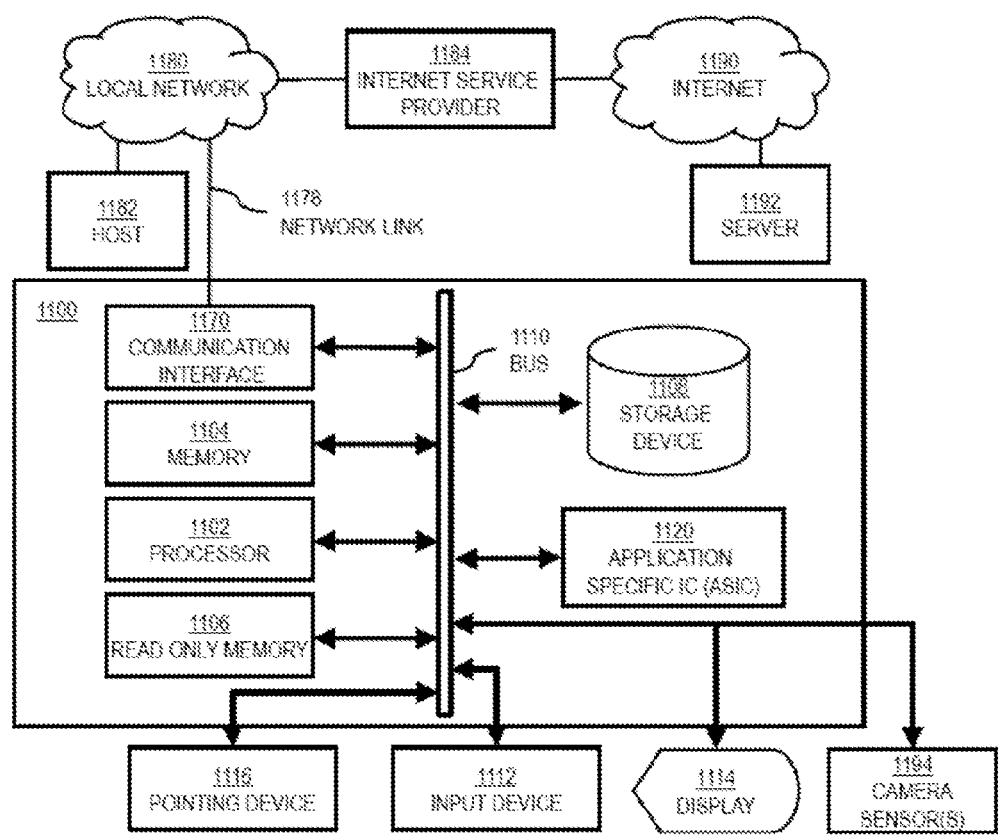
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to cause transmission of specification of a second location based record relative to the determined first location based record to the at least one device as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of causing transmission of specification of a second location based record relative to the determined first location based record to the at least one device.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to cause transmission of specification of a second location based record relative to the determined first location based record to the at least one device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1100 also includes a memory 1104 coupled to bus 1110. The memory 1104, such as a random access memory (RAM) or any other dynamic storage device, stores information including processor instructions for causing transmission of specification of a second location based record relative to the determined first location based record to the at least one device. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for causing transmission of specification of a second location based record relative to the determined first location based record to the at least one device, is provided to the bus 1110 for use by the processor from an external input device 1112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114, and one or more camera sensors 1194 for capturing, recording and causing to store one or more still and/or moving images (e.g., videos, movies, etc.) which also may comprise audio recordings. In some embodiments, for example, in embodiments in which the computer system 1100 performs all functions automatically without human input, one or more of external input device 1112, display device 1114 and pointing device 1116 may be omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 107 for causing transmission of specification of a second location based record relative to the determined first location based record to the at least one device to the UE 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to cause transmission of specification of a second location based record relative to the determined first location based record to the at least one device as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of causing transmission of specification of a second location based record relative to the determined first location based record to the at least one device.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to cause transmission of specification of a second location based record relative to the determined first location based record to the at least one device. The memory 1205 also stores the data associated with or generated by the execution of the inventive steps.

Figure 13:
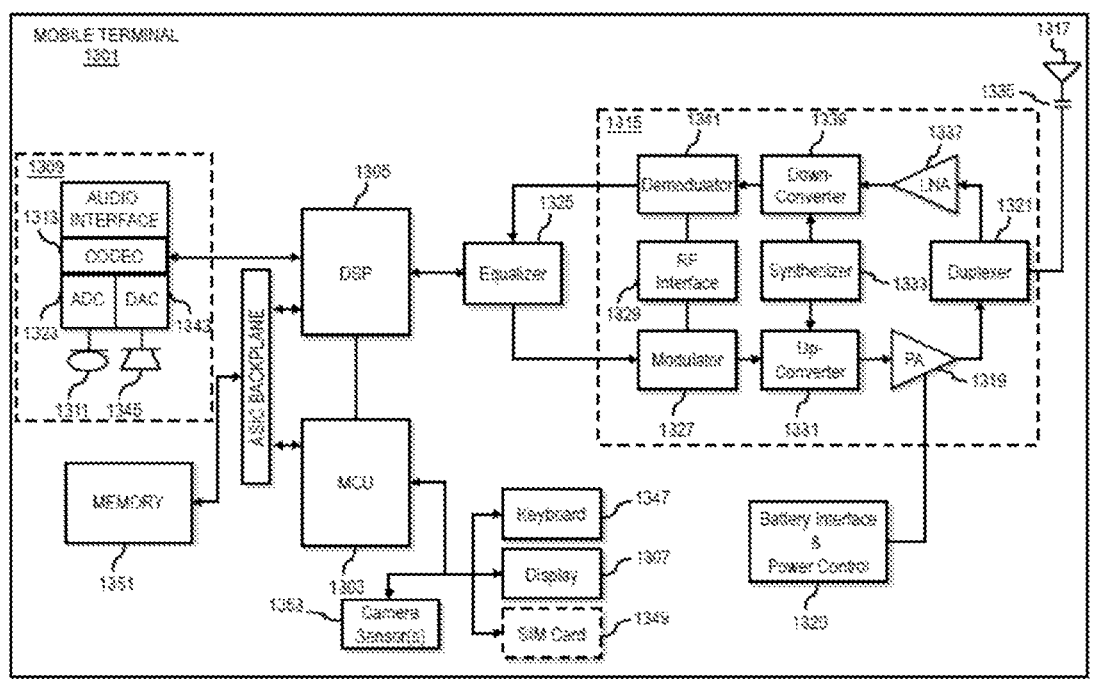
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of causing transmission of specification of a second location based record relative to the determined first location based record to the at least one device. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of causing transmission of specification of a second location based record relative to the determined first location based record to the at least one device. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to cause transmission of specification of a second location based record relative to the determined first location based record to the at least one device. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

Further, one or more camera sensors 1353 may be incorporated onto the mobile station 1301 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. A method comprising
    receiving a request for a point of interest from at least one device;
    determining a first location-based record associated with the at least one device;
    causing a specification of a second location-based record relative to the first location-based record, wherein the specification of the second location-based record relative to the first location-based record comprises reusing information associated with the first location-based record to specify the second location-based record when the point of interest shares one or more values with the first location-based record;
    associating the second location-based record with the point of interest; and
    causing transmission of the second location-based record to the at least one device.

2. A method of claim 1, wherein the first location-based record, the second location-based record, or a combination thereof includes, at least in part, a point-of-interest record, a contact record, or a combination thereof.

3. A method of claim 1, wherein the first location-based record includes, at least in part, one or more fields containing the one or more values, the method further comprising:
    causing the specification of one or more other values of one or more other fields of the second location-based record relative to the one or more values.

4. A method of claim 3, further comprising:
    abstracting the one or more values, the one or more other values, the first location-based record, the second location-based record, or a combination thereof.

5. A method of claim 4, wherein the abstraction comprises determining one or more codes for representing the one or more values, the one or more other values, the first location-based record, the second location-based record, or a combination thereof; and wherein the abstraction of a first one of the one or more values, the one or more other values, or a combination thereof is used independently of the abstraction of a second one of the one or more values, the one or more other values, or a combination thereof.

6. A method of claim 5, wherein the transmission of the second location-based record to the at least one device is based, at least in part, on the one or more codes.

7. A method of claim 5, further comprising:
    determining the one or more codes based, at least in part, one or more geographic areas associated with the first location-based record, the second location-based record, or a combination thereof.

8. A method of claim 5, further comprising:
    preloading of the one or more codes at the at least one device.

9. A method of claim 1, further comprising:
    determining the first location-based record, the second location-based record, or a combination thereof based, at least in part, on location information associated with the at least one device.

10. An apparatus comprising:
    at least one processor; and
    at least one memory including computer program code for one or more programs,
    the at least one memory and the computer program code configured to, with the at least one processor, cause the apparatus to perform at least the following:
        receive a request for a point of interest from at least one device;

determine a first location-based record associated with the at least one device;

cause, at least in part, a specification of a second location-based record relative to the first location-based record, wherein the specification of the second location-based record relative to the first location-based record comprises reusing information associated with the first location-based record to specify the second location-based record when the point of interest shares one or more values with the first location-based record;

associate the second location-based record with the point of interest; and cause, at least in part, a transmission of the second location-based record to the at least one device.

11. An apparatus of claim 10, wherein the first location-based record, the second location-based record, or a combination thereof includes, at least in part, a point-of-interest record, a contact record, or a combination thereof.

12. An apparatus of claim 10, wherein the first location-based record includes, at least in part, one or more fields containing one or more values, the method further comprising:

cause, at least in part, the specification of the one or more other values of one or more other fields of the second location-based record relative to the one or more values.

13. An apparatus of claim 12, wherein the apparatus is further caused to:

cause, at least in part, an abstraction of the one or more values, the one or more other values, the first location-based record, the second location-based record, or a combination thereof.

14. An apparatus of claim 13, wherein the abstraction comprises determining one or more codes for representing the one or more values, the one or more other values, the first location-based record, the second location-based record, or a combination thereof; and wherein the abstraction of a first one of the one or more values, the one or more other values, or a combination thereof is used independently of the abstraction of a second one of the one or more values, the one or more other values, or a combination thereof.

15. An apparatus of claim 14, wherein the transmission of the second location-based record to the at least one device is based, at least in part, on the one or more codes.

16. An apparatus of claim 14, wherein the apparatus is further caused to:

determine the one or more codes based, at least in part, one or more geographic areas associated with the first location-based record, the second location-based record, or a combination thereof.

17. An apparatus of claim 14, wherein the apparatus is further caused to:

cause, at least in part, a preloading of the one or more codes at the at least one device.

18. An apparatus of claim 10, wherein the apparatus is further caused to:

determine the first location-based record, the second location-based record, or a combination thereof based, at least in part, on location information associated with the at least one device.

19. A computer program product comprising at least one non-transitory computer-readable storage medium having computer executable program code instructions stored therein, the computer executable program code instructions configured to:

receive a request for a point of interest from at least one device;

determine a first location-based record associated with the at least one device;

cause a specification of a second location-based record relative to the first location-based record, wherein the specification of the second location-based record relative to the first location-based record comprises reusing information associated with the first location-based record to specify the second location-based record when the point of interest shares one or more values with the first location-based record;

associate the second location-based record with the point of interest; and cause transmission of the second location-based record to the at least one device.

20. The computer program product of claim 19, wherein the first location-based record includes, at least in part, one or more fields containing the one or more values, the computer program product further comprising program code instructions configured to:

cause the specification of one or more other values of one or more other fields of the second location-based record relative to the one or more values.

* * * * *

UNITED STATES PATENT AND TRADEMARK OFFICE
CERTIFICATE OF CORRECTION

PATENT NO. : 9,609,471 B2
APPLICATION NO. : 14/443331
DATED : March 28, 2017
INVENTOR(S) : Joshi et al.

Page 1 of 1

It is certified that error appears in the above-identified patent and that said Letters Patent is hereby corrected as shown below:

In the Claims

Column 26,
Line 2, "comprising" should read --comprising:--.

Signed and Sealed this
Twenty-third Day of January, 2018

Joseph Matal
*Performing the Functions and Duties of the
Under Secretary of Commerce for Intellectual Property and
Director of the United States Patent and Trademark Office*